United States Patent
Noto et al.

(10) Patent No.: US 8,135,269 B2
(45) Date of Patent: Mar. 13, 2012

(54) IMAGE PICKUP APPARATUS

(75) Inventors: Goro Noto, Tokyo (JP); Shinji Imada, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 102 days.

(21) Appl. No.: 12/814,165

(22) Filed: Jun. 11, 2010

(65) Prior Publication Data

US 2011/0002679 A1    Jan. 6, 2011

(30) Foreign Application Priority Data

Jul. 2, 2009 (JP) ................. 2009-157616

(51) Int. Cl.
*G03B 13/36* (2006.01)

(52) U.S. Cl. .......................................... 396/91; 396/95
(58) Field of Classification Search ............... 396/79, 396/80, 91, 95; 348/347
See application file for complete search history.

(56) References Cited

U.S. PATENT DOCUMENTS

| | | | | |
|---|---|---|---|---|
| 4,905,032 A | * | 2/1990 | Ishida et al. | 396/104 |
| 5,115,262 A | * | 5/1992 | Komiya | 396/91 |
| 5,649,237 A | | 7/1997 | Okazaki | |
| 6,430,368 B1 | * | 8/2002 | Hata | 396/79 |
| 2010/0225800 A1 | * | 9/2010 | Lee | 348/347 |
| 2011/0002679 A1 | * | 1/2011 | Noto et al. | 396/95 |

FOREIGN PATENT DOCUMENTS

| | | |
|---|---|---|
| JP | 7-225405 A | 8/1995 |
| JP | 2001-021794 A | 1/2001 |

* cited by examiner

*Primary Examiner* — W. B. Perkey
(74) *Attorney, Agent, or Firm* — Rossi, Kimms & McDowell LLP

(57) ABSTRACT

An optical device includes a shooting optical system including an AF lens, an AF lens driving apparatus for driving the AF lens, a detection unit for detecting a defocus amount corresponding to a difference between an image pickup position of an object and an imaging position of the object which is formed by the shooting optical system, and a control unit for drive-controlling the AF lens driving apparatus to reduce the defocus amount. The control unit detects a shooting magnification of the shooting optical system and changes a method of controlling the AF lens driving apparatus to reduce the defocus amount based on the shooting magnification.

5 Claims, 8 Drawing Sheets

IMAGE PICKUP APPARATUS

BACKGROUND OF THE INVENTION

1. Field of the Invention

The present invention relates to an image pickup apparatus, and more particularly, to automatic focus adjustment control for photographing.

2. Description of the Related Art

In recent cameras, all operations important for photographing, such as exposure determination and the focusing, are automated, and hence it is extremely less likely to cause failure in shooting by even a person unskilled in camera operations. An image stabilization system for preventing image blur caused by shaking applied to a camera has been recently studied, and hence there is almost no factors inducing a photographer's error in shooting.

However, in shooting an object under a state in which a camera is close to the object (hereinafter, referred to as macro-photographing), there has been a problem in that so-called out-of-focus shooting occurs because of a movement of the object in an optical axis direction or a movement of the camera itself in the optical axis direction caused by shaking. Therefore, in order to solve this problem, a conventional technology for correcting the out-of-focus based on an output of an acceleration sensor is disclosed in, for example, Japanese Patent Application Laid-Open No. H07-225405.

However, in the conventional technology disclosed in Japanese Patent Application Laid-Open No. H07-225405, it is necessary to mount the acceleration sensor and a processing circuit for the acceleration sensor, resulting in an increase in its manufacturing cost. In addition, spaces for mounting the devices are required, resulting in a problem in that the size of the image pickup apparatus increases.

When the acceleration sensor is not mounted, in order to suppress the out-of-focus shooting, autofocus (hereinafter, referred to as AF) for macro-photographing may be set to a so-called continuous mode. Therefore, during determination of a picture composition by a user, a distance to the object is continuously measured to adjust the focus, thereby being capable of reducing so-called defocus amount.

The continuous mode is originally provided as an AF adjustment method for a moving object. Japanese Patent Application Laid-Open No. 2001-021794 discloses that, in the continuous mode, the detecting of a defocus amount and a driving of a focus lens are continuously and alternatively performed, that an image plane position after a lapse of a predetermined time from the detection of a focus position is estimated, and that the distance to the object is continuously measured during the determination of a picture composition by the user to reduce the defocus amount.

However, during macro-photographing, a focus position frequently varies, and a focus variation speed frequently changes or a focus variation direction frequently reverses. Therefore, even when the continuos mode is set, an actual AF lens position is deviated from an object position as illustrated in FIG. 8. Thus, the defocus during macro-photographing cannot be sufficiently suppressed by the conventional AF adjustment method based on the continuous mode.

SUMMARY OF THE INVENTION

An object of the present invention is to provide an optical device capable of shooting while defocus is moderated even when shooting a moving object at a normal photographing distance or macro-photographing.

According to one aspect of the present invention, an image pickup apparatus includes: a magnification information obtaining unit for obtaining information including a shooting magnification of a shooting optical system; a control unit for performing focus control on the shooting optical system; and a detection unit for detecting a defocus amount corresponding to a difference between an image pickup position of an object and an imaging position of the object which is formed by the shooting optical system, in which the control unit repeats the focus control even after an in-focus state of the shooting optical system is obtained by the focus control, and in which when the shooting magnification is equal to or larger than a predetermined value, the control unit sets a sampling frequency for detecting the defocus amount to a value larger than in a case where the shooting magnification is smaller than the predetermined value.

According to another aspect of the present invention, an image pickup apparatus includes: a magnification information obtaining unit for obtaining information including a shooting magnification of a shooting optical system; a control unit for performing focus control on the shooting optical system; and a detection unit for detecting a defocus amount corresponding to a difference between an image pickup position of an object and an imaging position of the object which is formed by the shooting optical system, in which the control unit estimates an imaging position of the object in the future based on an imaging position of the object in the past and repeats the focus control even after an in-focus state of the shooting optical system is obtained by the focus control so as to reduce the defocus amount with respect to the imaging position of the object in the future based on the imaging position of the object in the future which is estimated, and in which when the shooting magnification is equal to or larger than a predetermined value, the control unit sets a number of data of the imaging position of the object in the past which are used to estimate the imaging position of the object in the future, the number being smaller than a number of data of the imaging position of the object in the past in a case where the shooting magnification is smaller than the predetermined value.

According to the another aspect of the present invention, a lens apparatus is removably mountable to the image pickup apparatus set out in the foregoing, and includes the shooting optical system.

According to still another aspect of the present invention, an image pickup apparatus includes: a magnification information obtaining unit for obtaining information including a shooting magnification of a shooting optical system; a control unit for performing focus control on the shooting optical system; and a detection unit for detecting a defocus amount corresponding to a difference between an image pickup position of an object and an imaging position of the object which is formed by the shooting optical system, in which when the shooting magnification is equal to or larger than a predetermined value, the control unit repeats the focus control even after an in-focus state of the shooting optical system is obtained by the focus control so as to reduce the defocus amount with respect to an imaging position of the object in the past without estimating an imaging position of the object in the future, and in which when the shooting magnification is smaller than the predetermined value, the control unit estimates the imaging position of the object in the future based on the imaging position of the object in the past and repeats the focus control even after the in-focus state of the shooting optical system is obtained by the focus control so as to reduce the defocus amount with respect to the imaging position of the object in the future based on the imaging position of the object in the future which is estimated.

According to the present invention, an optical device capable of performing shooting while the out-of-focus shooting is suppressed in a case of shooting a moving object at a normal shooting distance and in a case of macro-photographing may be provided.

Further features of the present invention will become apparent from the following description of exemplary embodiments with reference to the attached drawings.

DESCRIPTION OF THE EMBODIMENTS

Figure 1:
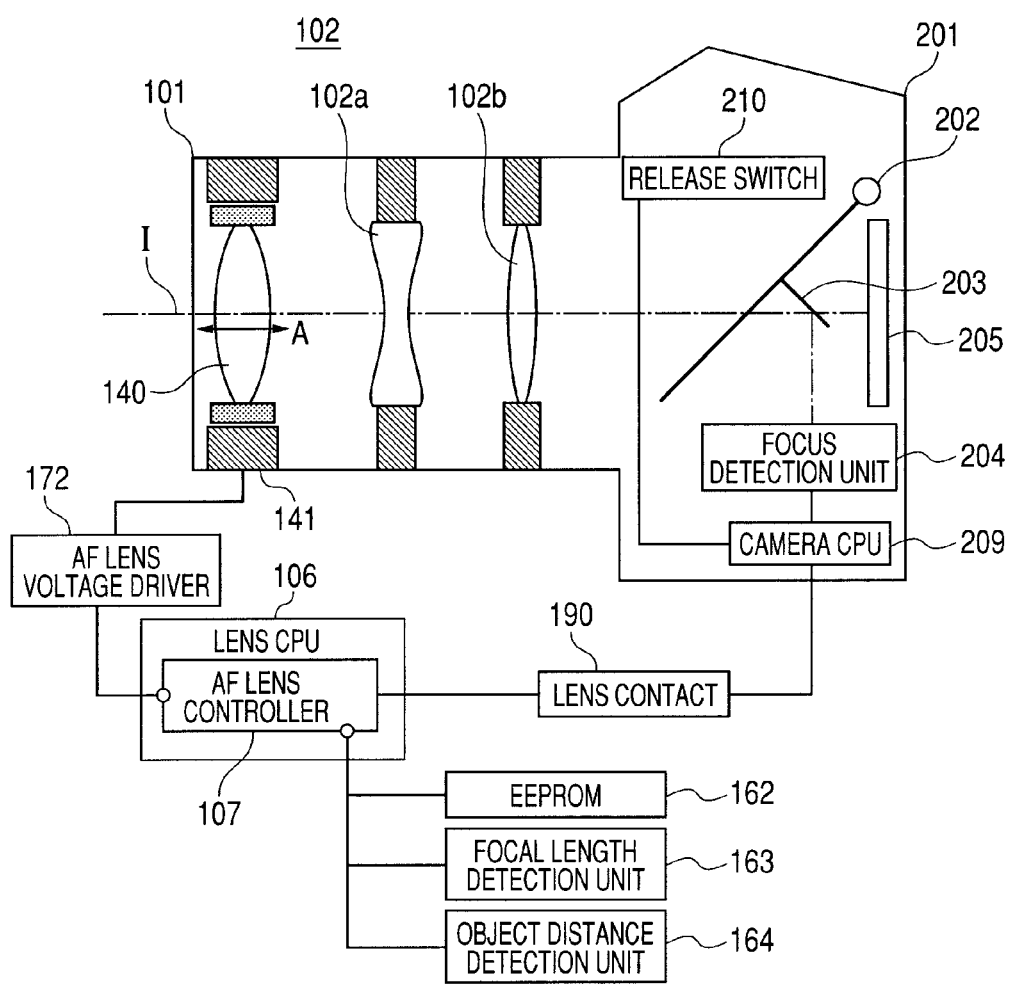
FIG. 1 is a block diagram illustrating an optical device according to the present invention.

Hereinafter, exemplary embodiments of the present invention are described in detail with reference to the attached drawings. FIG. 1 is a block diagram illustrating an optical device according to each of first and second embodiments of the present invention.

First Embodiment

Hereinafter, a method of drive control of an autofocus (AF) adjustment apparatus in the first embodiment of the present invention is described with reference to FIGS. 1, 2, 3, 4A, and 4B.

The optical device according to the first embodiment of the present invention includes a lens apparatus 101 and an image pickup apparatus 201.

The lens apparatus 101 includes a shooting optical system 102, an AF lens driving unit 141, and a lens CPU 106. The shooting optical system 102 includes multiple lenses 102a and 102b and an AF lens 140. The AF lens driving unit 141 includes an ultrasonic motor or a stepping motor as a driving source and drives the AF lens 140 in a direction of an optical axis I (direction indicated by arrow "A" of FIG. 1).

The lens CPU 106 is a central processing unit for performing various controls of the lens apparatus 101. The lens CPU 106 calculates a focal length based on a pulse signal output from a focal length detection unit 163 and calculates an object distance based on a pulse signal which is an output of an object distance detection unit 164. The lens CPU 106 includes an AF lens controller 107.

The lens CPU 106 may communicate with a camera CPU 209 included in the image pickup apparatus 201 through a lens contact 190 provided between the lens apparatus 101 and the image pickup apparatus 201 connected to the lens apparatus 101. An AF lens voltage driver 172 generates a voltage for drive-controlling the AF lens driving unit 141.

An electrically erasable programmable read-only memory (EEPROM) 162 is a nonvolatile memory unit for storing lens data which are various information specific to the lens apparatus 101 and coefficients used to convert the pulse signal output from the object distance detection unit 164 into a physical quantity.

The focal length detection unit 163 which is a zoom encoder detects the focal length and outputs the pulse signal corresponding to the focal length to the AF lens controller 107. The object distance detection unit 164 which is a focusing encoder detects a distance to the object. The object distance detection unit 164 detects a position of the shooting optical system 102 and outputs the pulse signal corresponding to the detected position to the AF lens controller 107.

The image pickup apparatus 201 includes a main mirror 202 for guiding a light beam from the object to a finder (not shown), a sub mirror 203 for guiding a light beam to a focus detection unit 204, and an image pickup element 205 provided close to an imaging plane of the shooting optical system 102.

A defocus amount corresponding to a difference between an image pickup position of the object (image pickup position of image pickup element 205 in this embodiment) and a position of an image of the object formed by the shooting optical system 102 which performs a shooting operation is calculated based on an image deviation amount between two images of object light beams passing through two different regions sandwiching the optical axis I of the shooting optical system 102 between the two different regions. To be specific, as the case of a known technology, the light beams corresponding to the two images pass through the main mirror 202 serving as a half mirror, are reflected on the sub mirror 203 located in the rear of the main mirror 202, and are guided to the focus detection unit 204 by a focus detection optical system (not shown). The focus detection unit 204 includes a photoelectric conversion element. The camera CPU 209 reads signals of the two images from the photoelectric conversion element and performs correlation calculation to calculate the image deviation amount, to thereby obtain the defocus amount.

The imaging position of the object may be obtained based on the obtained defocus amount and the position of the shooting optical system 102 which is detected by the object distance detection unit 164.

The camera CPU 209 is a central processing unit for performing various controls of the entire camera system. Information about a release switch 210 is input to the camera CPU 209, and hence whether the release switch 210 is pressed half-way down (hereinafter, referred to as SW1_ON) or fully down (hereinafter, referred to as SW2_ON) may be detected.

The release switch 210 causes to start a series of image pickup preparation operations when an half-way press down operation of a release bottom (not shown) is detected and causes to start an image pickup operation when a fully press down operation of the release bottom is detected.

In synchronization with the SW1_ON when the release switch 210 is pressed half-way down, the defocus information from the focus detection unit 204 and a drive start command for the AF lens 140 are sent to the lens CPU 106 through the camera CPU 209. In synchronization with the half-way down press "OFF", an AF lens drive stop signal is sent from the focus detection unit 204 to the lens CPU 106 through the camera CPU 209.

Figure 2:
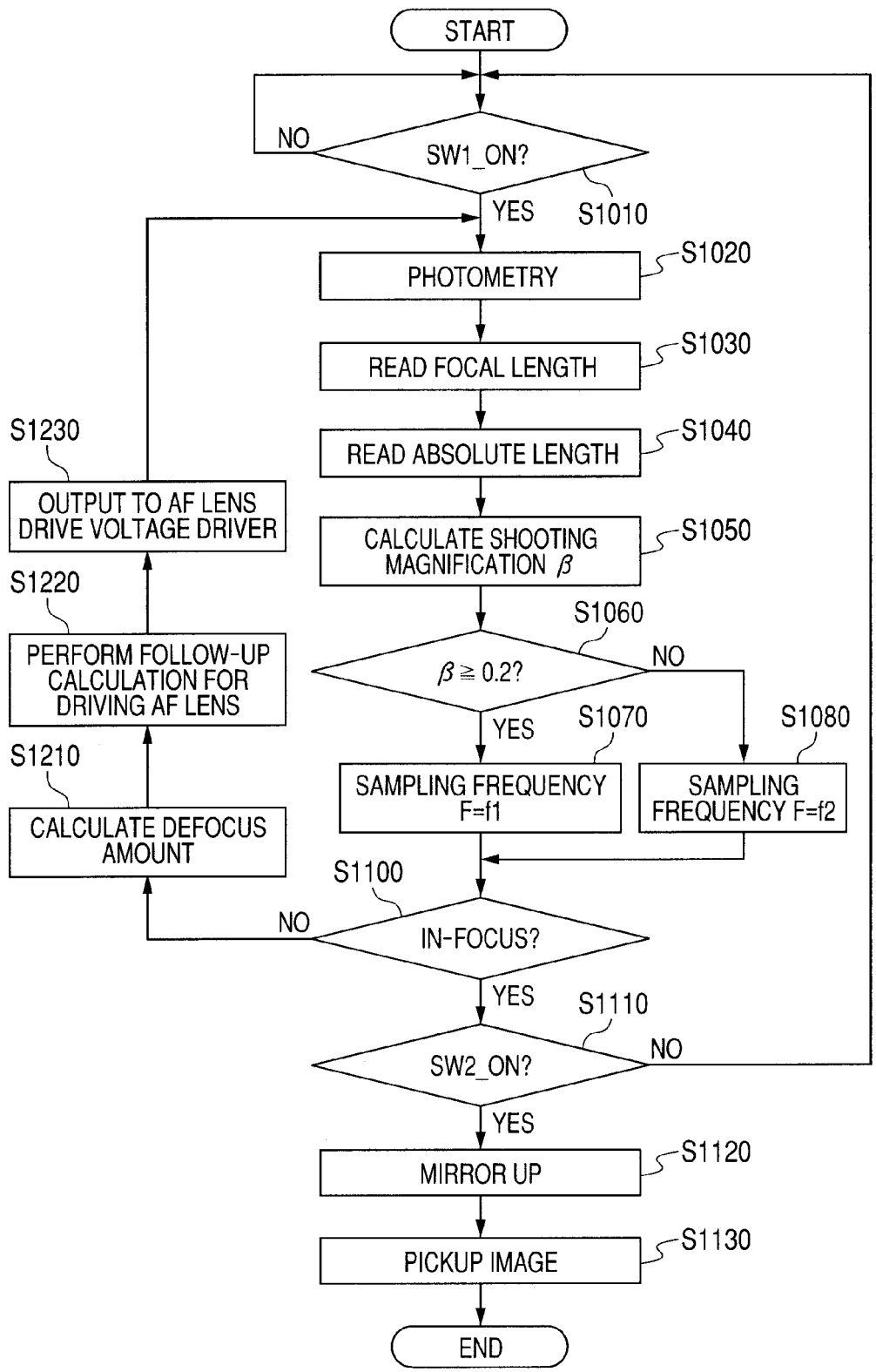
FIG. 2 is a flow chart illustrating control in a first embodiment of the present invention.

FIG. 2 shows a flow chart illustrating an operation flow of the AF lens 140 of an AF adjustment apparatus in this embodiment. Hereinafter, an AF adjustment operation of the AF lens 140 is described with reference to FIG. 2. In this case, it is assumed that a continuous mode is set for AF.

In Step (hereinafter referred to as S) 1010, when the release switch 210 is pressed half-way down to set SW1_ON, the process proceeds to S1020 to perform photometry.

Then, in S1030, the lens CPU 106 reads the pulse signal corresponding to the focal length from the focal length detection unit 163. The pulse signal corresponding to the focal length is used to calculate a shooting magnification β.

Then, in S1040, the lens CPU 106 reads the pulse signal corresponding to the position of the shooting optical system 102 from the object distance detection unit 164.

Next, in S1050, the shooting magnification β is calculated by the lens CPU 106 based on the pulse signal corresponding to the focal length and the pulse signal corresponding to the position of the shooting optical system 102. An expression used to calculate the shooting magnification β is specific to the structure of the optical system. The shooting magnification is calculated using the shooting magnification calculation expression. The shooting magnification β is not necessarily calculated using a predetermined shooting magnification calculation expression and may be read from the EEPROM 162 which in advance stores the shooting magnifications as table data with respect to the encoder positions of focal lengths and absolute lengths.

In S1060, whether or not the shooting magnification β is equal to or larger than 0.2 is determined. When the shooting magnification β is equal to or larger than 0.2, the process proceeds to S1070. When shooting magnification β is smaller than 0.2, the process proceeds to S1080.

In S1070, a defocus amount calculation period of the camera CPU 209, the pulse signal corresponding to the focal length from the focal length detection unit 163, and the pulse signal corresponding to the position of the shooting optical system 102 from the object distance detection unit 164 are read. A sampling frequency F which is the period to calculate the shooting magnification of the lens CPU 106 is set to f1 (for example, 40 Hz).

On the other hand, in S1080, the sampling frequency F is set to f2, which is smaller than f1 (for example, 10 Hz).

A reason why the sampling frequency F is changed depending on shooting magnification β and a reason why f1>f2 is satisfied are described.

Assume that a distance from the object to a principal point (not shown) of the shooting optical system 102 is denoted by "a", a distance (image plane distance) from the principal point (not shown) of the shooting optical system 102 to the imaging plane of the shooting optical system 102 is denoted by "b", and the focal length of the shooting optical system 102 is denoted by "f", the following expression holds in a case of an in-focus state.

$$(1/a)+(1/b)=1/f$$

In other words, in a case where the focal length f is constant, when the object is far away from the image pickup apparatus 201 ("a" is large) and the object is still or slowly moving or when the image pickup apparatus 201 slowly moves because of shaking, the amount of variation in "a" relative to "a" is small, and hence the image plane distance "b" does not significantly change. Therefore, when the object is far away from the image pickup apparatus 201, that is, when the shooting magnification is small, the image plane distance does not significantly change, and hence the in-focus precision is not effected even when the sampling frequency is reduced.

Even when a known imaging position predictive method applied to the moving object is performed, the sampling frequency is desirably set to a small value. This reason is as follows. An imaging position in the future is estimated based on a linear straight line passing through multiple imaging positions of the object which are obtained in the past. In this case, the longer the time interval in which the imaging positions of the object were obtained was, in other wards, the smaller the sampling frequency was, the smaller the difference between the imaging position in the future and the estimated imaging position based on the multiple imaging positions in the past can be. This point is described with reference to FIG. 3.

Figure 3:
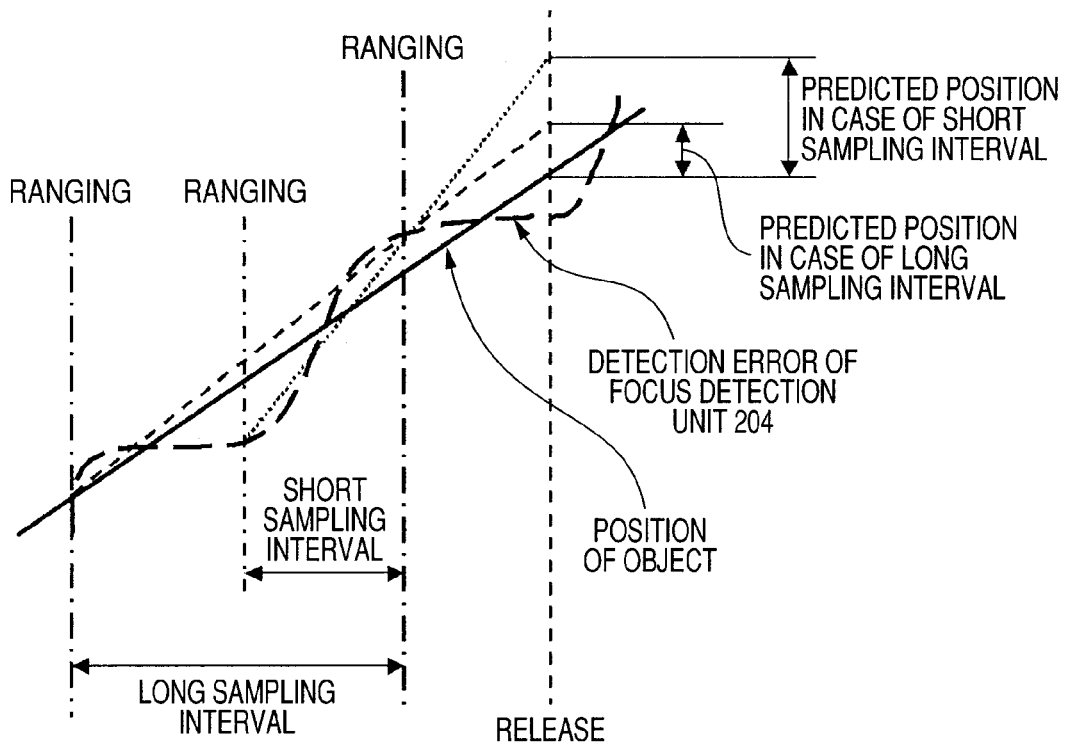
FIG. 3 is an explanatory diagram illustrating a relationship between a sampling period and a predictive error.

The focus detection unit 204 has an object position detection error in detecting the actual object position (solid line of FIG. 3), and hence the object position detected by the focus detection unit 204 is indicated by a long broken line in FIG. 3 contrary to the actual position of the object (solid line).

An imaging position at a timing when SW2_ON is set by the release switch 210 being fully pressed (broken line indicated as "release timing" in FIG. 3) is estimated based on the detected object position.

Detection errors of imaging positions (indicated by broken line in FIG. 3) predicted in a case where the sampling frequency is small (indicated as "long sampling interval" in FIG. 3) are averaged, and hence an error corresponding to the difference between the actual object position and the estimated object position is small.

In contrast, detection errors of imaging positions (indicated by short broken line (dot line) in FIG. 3) predicted in a case where the sampling frequency is large (indicated as "short sampling interval" in FIG. 3) are not satisfactorily averaged, and hence an error corresponding to the difference between the actual object position and the estimated object position is larger than in the case where the sampling frequency is small.

Therefore, when the known imaging position predictive method applied to the moving object is performed, the sampling frequency is desirably set to a small value.

In contrast to this, in a case where the object is close to the image pickup apparatus 201, even when the object slowly moves in the optical axis direction or the image pickup apparatus 201 slowly moves in the optical axis direction because of shaking, an image plane distance non-linearly varies with respect to a change in object distance.

Figure 8:
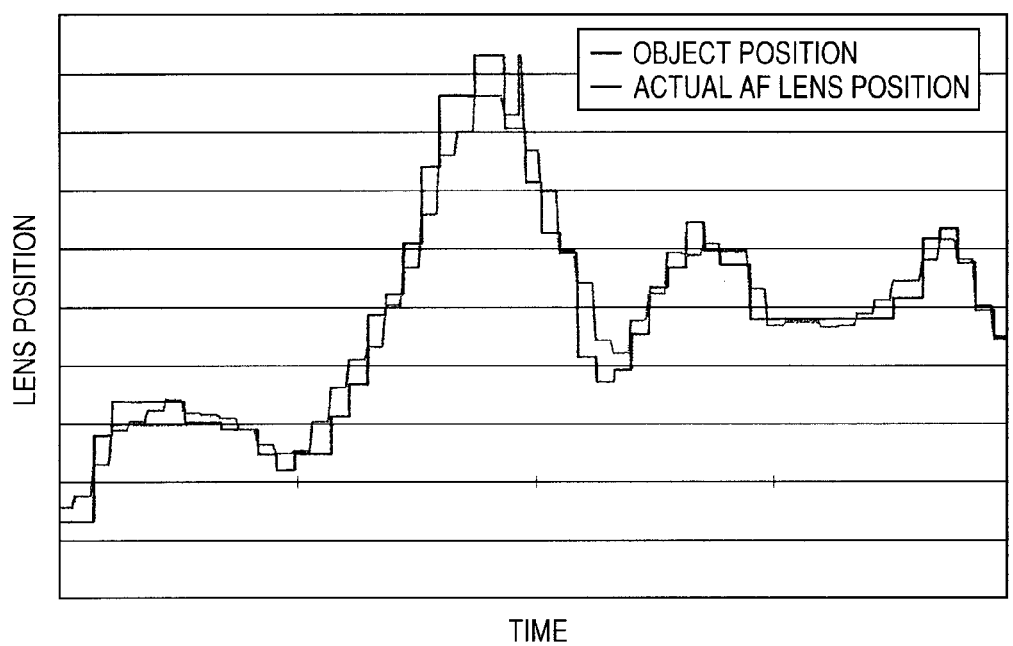
FIG. 8 illustrates a comparison between an object position and an actual AF lens position in a conventional optical device.

As illustrated in FIG. 8, the object distance is short in the macro-photographing in which the object is close to the image pickup apparatus 201, and hence the focus position frequently varies, and the speed of the focus variation frequently changes or the direction of the focus variation frequently reverses. Therefore, when the sampling frequency in the continuous mode is small, the variation in focus position or the change in focus variation speed cannot be followed by the estimation of the object position, and hence the actual position of the AF lens 140 is deviated from the object position. As a result, out-of-focus shooting occurs.

Thus, in the case where the object is close to the image pickup apparatus 201, that is, in the case where the shooting magnification is large, the out-of-focus can be moderated by increasing the sampling frequency.

Based on the fact, in this embodiment, the sampling period is changed depending on the shooting magnification β. When the shooting magnification is larger than a reference shooting magnification (equal to or larger than predetermined value), the sampling frequency is increased.

When the sampling frequency is changed depending on the shooting magnification β as described above, shooting may be performed while reducing the defocus amount to moderate the out-of-focus shooting even in the case of shooting a moving object at a normal shooting distance and in the case of macro-photographing.

The description returns to the flow chart illustrated in FIG. 2.

In S1100, whether or not the in-focus state is obtained in the position of the AF lens 140 at this time is determined. When the in-focus state is obtained, the process proceeds to S1110. When the in-focus state is not obtained, the process proceeds to S1210.

When the process proceeds to S1110, whether or not the release switch 210 is pressed fully down to set SW2_ON state is determined in S1110. When the release switch 210 is in the SW2_ON state, the process proceeds to S1120. When the release switch 210 is not in the SW2_ON state, the process returns to S1010.

In S1120, the main mirror 202 is flipped up for shooting preparation.

In S1130, a series of image pickup operations, such as an operation of a stop (not shown) provided in the lens apparatus 101 and an opening of a shutter (not shown) provided in the image pickup apparatus 201, are performed based on a result obtained by photometry in S1020. The operations are known, and hence the detailed description is omitted here.

When the process proceeds to S1210 from S1100, the camera CPU 209 reads the signals of the two images from the photoelectric conversion element at the sampling frequency set in S1070 or S1080 and performs correlation calculation to obtain the image deviation amount, to thereby obtain the defocus amount.

In S1220, follow-up control calculation for driving the AF lens 140 is performed at the sampling frequency set in S1070 or S1080 based on the defocus amount obtained in S1210.

In S1230, a result obtained by the follow-up control calculation in S1220 is output to the AF lens voltage driver 172 for driving the AF lens 140. After that, the process returns to S1020. In this case, the AF lens 140 is moved by a predetermined amount.

In this embodiment, the sampling frequency F is set to f1 or f2 based on the shooting magnification β using 0.2 as a reference. In other words, the sampling frequency F is set to either one of the two frequencies based on the shooting magnification β. However, the present invention is not limited to this.

Figure 4A:
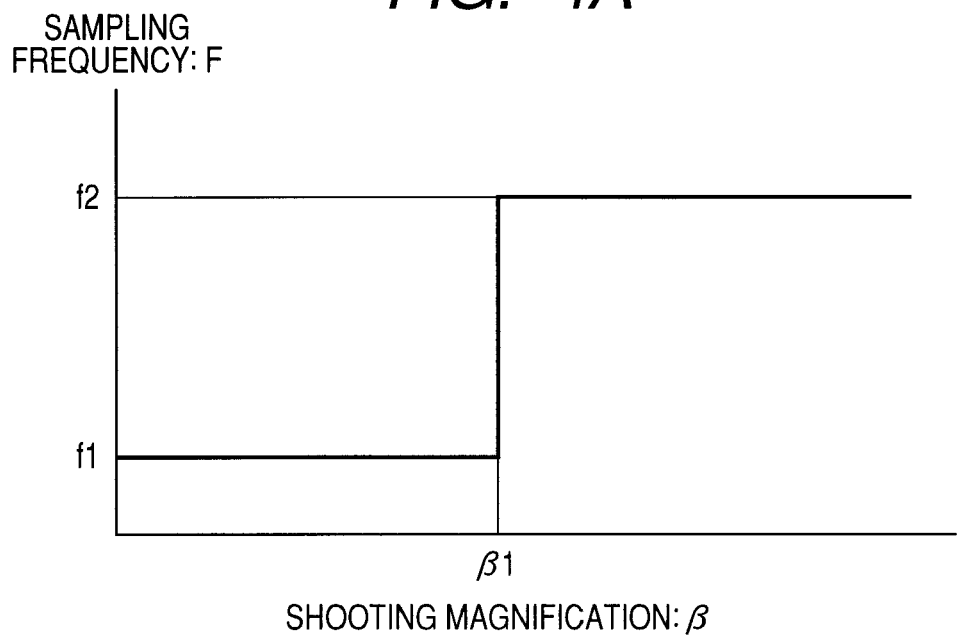
FIGS. 4A and 4B illustrate a modified example of the first embodiment of the present invention.
Figure 4B:
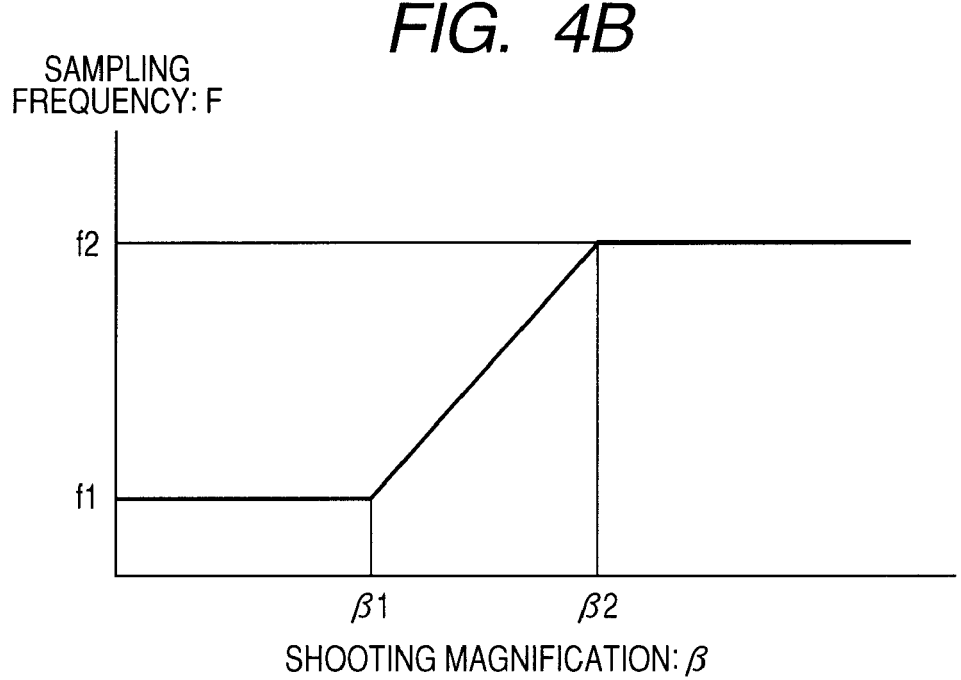

With respect to an example illustrated in FIG. 4A, when the shooting magnification β is β1 (β1=0.2) in the case described above, the sampling frequency F is changed from f1 to f2 or from f2 to f1. However, as illustrated in FIG. 4B, in a case where the shooting magnification is between β1 (for example, β1=0.2) and β2 (for example, β2=0.5), the same effect is obtained even when the sampling frequency F is continuously changed corresponding to the change in shooting magnification.

Second Embodiment

Hereinafter, an autofocus (AF) adjustment apparatus drive control method in the second embodiment of the present invention is described with reference to FIG. 5.

Figure 5:
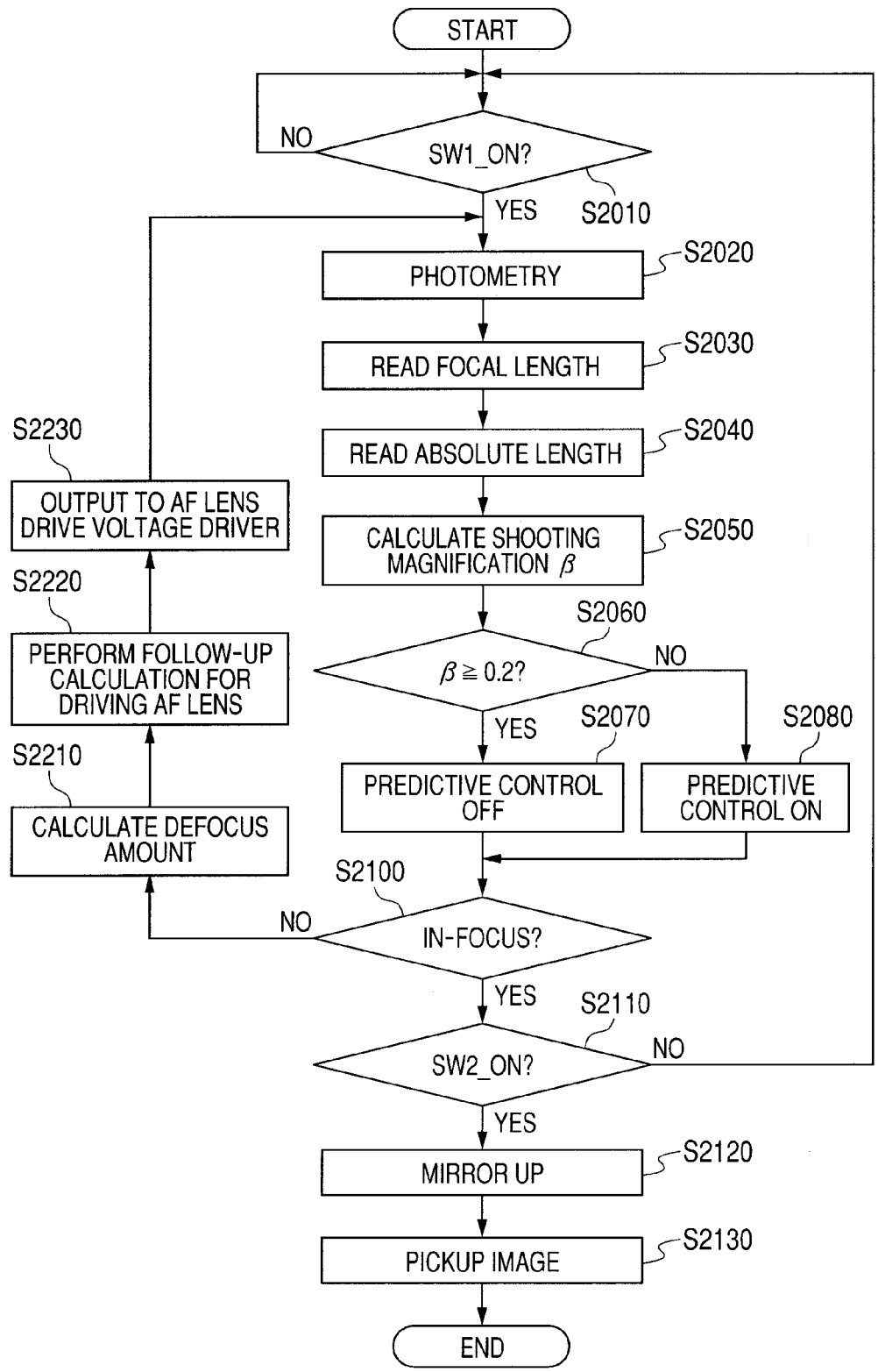
FIG. 5 is a flow chart illustrating control in a second embodiment of the present invention.

FIG. 5 shows a flow chart illustrating an operation flow of the AF lens 140 of the AF adjustment apparatus in this embodiment. Hereinafter, the AF adjustment operation of the AF lens 140 is described. In this case, similarly to the first embodiment, the continuous mode is set for AF.

The processes of S2010 to S2050 correspond to the processes of S1010 to S1050 as described in the first embodiment, and hence the description thereof is omitted here.

In S2060, whether or not the shooting magnification β is equal to or larger than 0.2 is determined. When the shooting magnification β is equal to or larger than 0.2, the process proceeds to S2070. When shooting magnification β is smaller than 0.2, the process proceeds to S2080.

In S2070, the predictive control of the imaging position in the continuous mode is set to "OFF".

On the other hand, in S2080, the predictive control of the imaging position in the continuous mode is set to "ON".

The reason why ON/OFF of the predictive control of the image plane apparatus is changed depending on shooting magnification β is described.

As illustrated in FIG. 8, in the case of macro-photographing, the focus position frequently varies due to the variation in object distance, and the focus variation speed frequently changes or the focus variation direction frequently reverses. Therefore, there is a case where it is difficult to set a drive target position of the AF lens to the actual object distance at higher precision. Thus, even when the drive target position of the AF lens is set by the predictive control in the continuous mode, the position of the AF lens during shooting may be different from the in-focus position of the object.

Therefore, the predictive control in the continuous mode is stopped during the macro-photographing, and a focusing operation for moving the AF lens to a position corresponding to a measured object distance is repeated until SW2_ON is set in S2110 described later, to thereby follow up a focus variation to suppress out-of-focus shooting.

In contrast to this, in the case where the shooting magnification is small, that is, in the case where the object is far away from the image pickup apparatus 201, as is also described in the first embodiment, when a relative change in object distance due to the slow movement of the image pickup apparatus 201 in the optical axis direction which is caused by shaking is small, the image plane distance "b" does not significantly change. However, for example, when an object at a long distance is moving at high velocity, the change in the image plane distance "b" due to the change in the object distance "a" can be easily estimated in a range which does not cause an out-of-focus shooting because the object distance is large. Therefore, in the case where the shooting magnification is small, the known imaging position predictive control is effective to suppress the out-of-focus shooting.

If whether or not to apply the imaging position predictive control is changed depending on the shooting magnification β, the shooting may be performed while the out-of-focus shooting is suppressed even in the case of shooting the moving object at a normal shooting distance and in the case of macro-photographing.

The description returns to the flow chart illustrated in FIG. 5.

The processes of S2100 to S2130 and S2210 to 2230 correspond to the processes of S1100 to S1130 and S1210 to S1230 as described in the first embodiment, and hence the description is omitted here.

Figure 6:
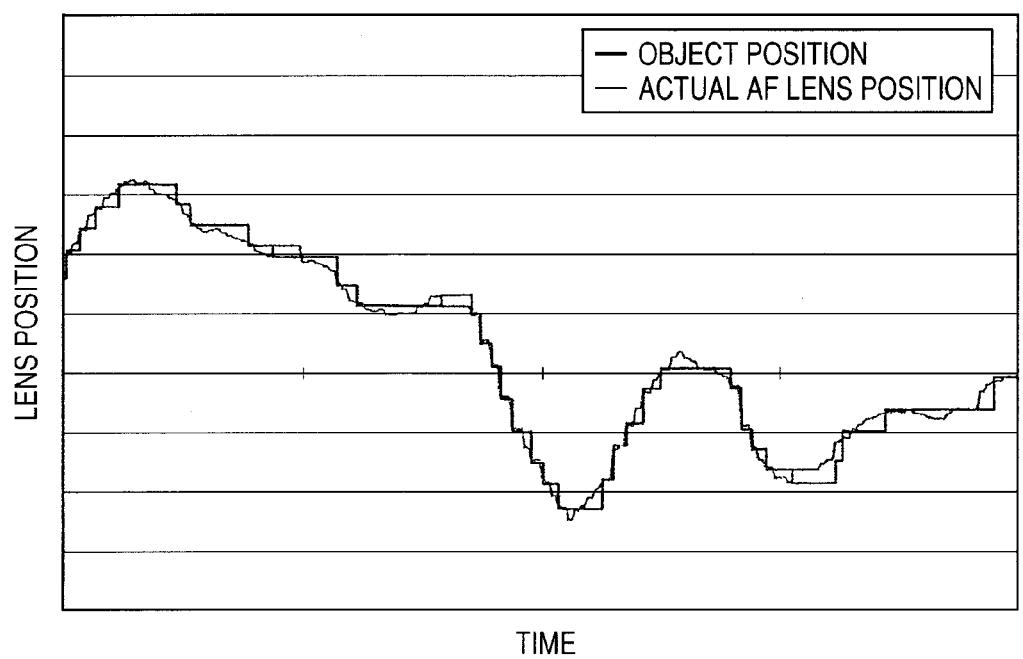
FIG. 6 illustrates a comparison between an object position and an actual AF lens position in the first and second embodiments of the present invention.

FIG. 6 illustrates a comparison between the object position and the actual position of the AF lens 140 in a case where the control methods described in the first and second embodiments are applied in parallel. In other words, the result illustrated in FIG. 6 is a result obtained by not the predictive control but the control performed to reduce the defocus amount based on the past imaging positions of the object which are detected at the sampling frequency f1 in the case where the shooting magnification β is equal to or larger than 0.2.

As is apparent from FIG. 6, when the sampling frequency is set to f1 (40 Hz) and the predictive control in the continuous mode is not performed, the actual position of the AF lens 140 follows the change in object position.

Therefore, it is apparent that the shooting in which the out-of focus shooting is more suppressed than in a conventional case may be performed during the macro-photographing. In contrast to this, in normal photographing in which the shooting magnification β is smaller than 0.2, the sampling frequency F is desirably set to f2 smaller than f1 to perform the predictive control.

In the second embodiment, the predictive control in the continuous mode is switched between ON state and OFF state based on the shooting magnification β. However, the present invention is not limited to this.

A modified example of the second embodiment is described with reference to, for example, a flow chart of FIG. 7.

Figure 7:
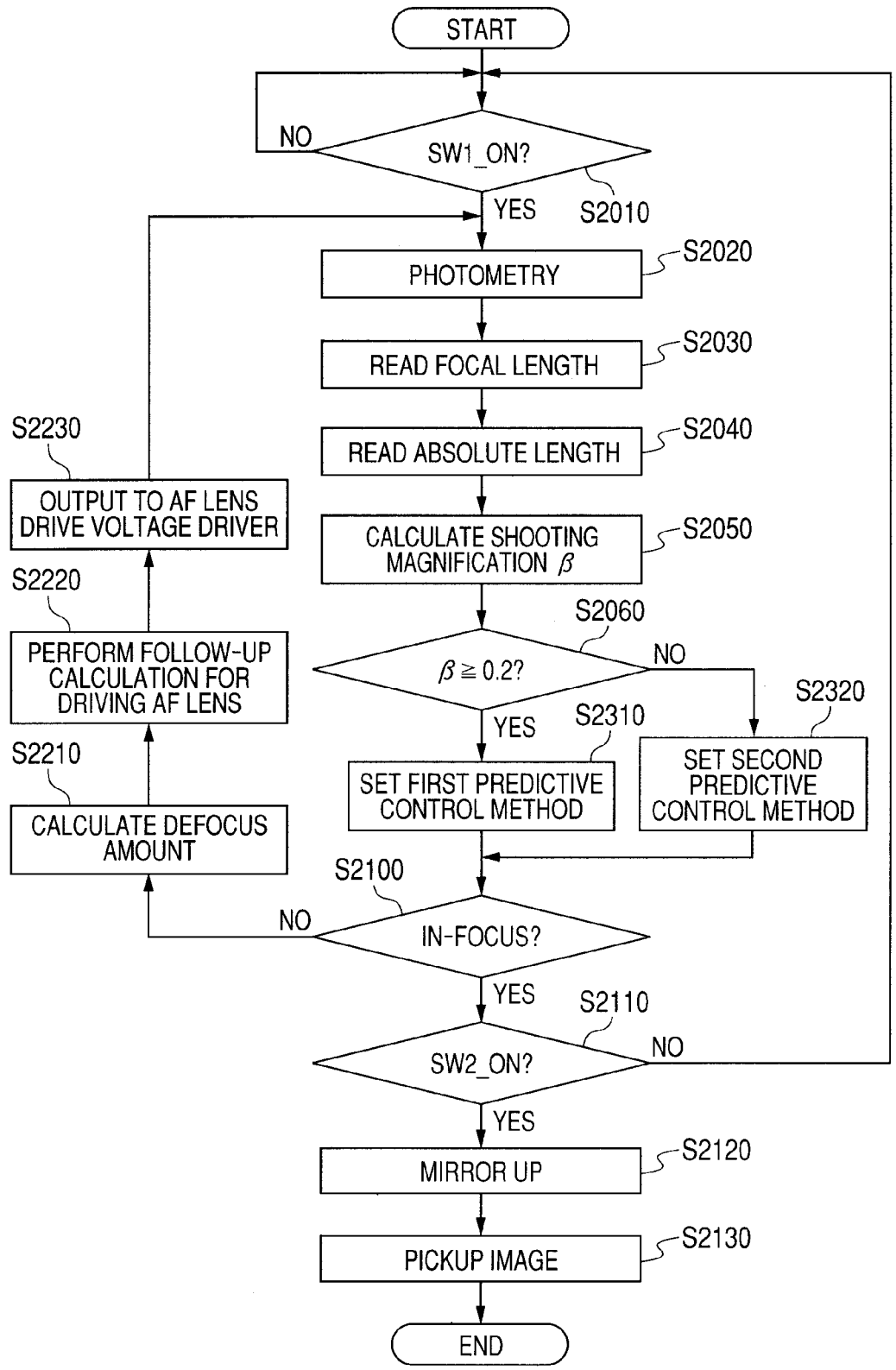
FIG. 7 illustrates a modified example of the second embodiment of the present invention.

In FIG. 7, the modified example is different from the second embodiment in the process based on a result obtained by determination of the shooting magnification β in S2060.

In S2060, when the shooting magnification β is equal to or larger than 0.2, the process proceeds to S2310. On the other hand, when the shooting magnification β is smaller than 0.2, the process proceeds to S2320.

In S2310, a first predictive control method is set as the predictive control of the imaging position in the continuous mode. The first predictive control method is, for example, a known method of predicting an imaging position after a lapse of a predetermined time from a detection point, based on two imaging positions of the object obtained in the past.

On the other hand, in S2320, a second predictive control method is set as the predictive control of the imaging position in the continuous mode. The second predictive control method is, for example, a known method of predicting an imaging position after a lapse of a predetermined time from a detection point, based on six imaging positions of the object obtained in the past.

A reason why the number of past imaging positions used for the predictive control is changed depending on the photograph magnification β is as follows.

During the macro-photographing, the objet distance is short, and hence it is likely to change the image plane distance by the influence of the movement of the object or shaking, to thereby cause an out-of-focus shooting. The change in movement speed of the imaging position or the reverse of the movement direction thereof frequently occurs within a short period of time. Therefore, even when an imaging position is to be estimated based on multiple pieces of past imaging position information, it is difficult to estimate the imaging position with high precision. Therefore, when predictive control is performed based on two imaging positions immediately before the SW2_ON state more related to an operation for a current imaging position, higher-prediction precision control may be achieved.

In contrast to this, when the shooting magnification is small, that is, when the object is far away from the image pickup apparatus 201, the change in object distance which affects the image plane distance may commonly occur in a case where the position of the object is significantly varied in the optical axis direction within a certain time interval. Therefore, when more past imaging positions of the object, for example, six points are used as predictive control data, an error between a predicted imaging position and an actual in-focus imaging position may be reduced. Thus, the out-of-focus shooting may be suppressed.

In other words, when a suitable predictive method is employed based on the shooting magnification β, shooting may be performed while the out-of-focus shooting is suppressed even in the case where a moving object is shot at a normal shooting distance and in the case of macro-photographing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, in each of the embodiments described above, an interchangeable lens type single-lens reflex camera is described. However, the present invention may be applied to other optical devices such as a video camera and an electronic still camera in which a lens and a camera are integrated.

In each of the embodiments, the apparatus for shooting the object using the image pickup element, the so-called digital type image pickup apparatus is described. However, the present invention may be applied to a so-called silver-halide film type image pickup apparatus for shooting the object using a film.

The shooting magnification β of 0.2 is used as a value for determining whether or not shooting is macro-photographing. However, even when a shooting magnification β of, for example, 0.3 or 0.5 is used as a determination value, the same effect is obtained.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-157616, filed Jul. 2, 2009, which is hereby incorporated by reference herein in its entirety.

What is claimed is:

1. An image pickup apparatus, comprising:
   a magnification information obtaining unit for obtaining information including a shooting magnification of a shooting optical system;
   a control unit for performing focus control on the shooting optical system; and
   a detection unit for detecting a defocus amount corresponding to a difference between an image pickup position of an object and an imaging position of the object which is formed by the shooting optical system,
   wherein the control unit repeats the focus control even after an in-focus state of the shooting optical system is obtained by the focus control, and
   wherein when the shooting magnification is equal to or larger than a predetermined value, the control unit sets a sampling frequency for detecting the defocus amount to a value larger than in a case where the shooting magnification is smaller than the predetermined value.

2. A lens apparatus removably mountable to the image pickup apparatus according to claim 1, comprising the shooting optical system.

3. An image pickup apparatus, comprising:
   a magnification information obtaining unit for obtaining information including a shooting magnification of a shooting optical system;
   a control unit for performing focus control on the shooting optical system; and a detection unit for detecting a defocus amount corresponding to a difference between an image pickup position of an object and an imaging position of the object which is formed by the shooting optical system, wherein the control unit estimates an imaging position of the object in the future based on an imaging position of the object in the past and repeats the focus control even after an in-focus state of the shooting optical system is obtained by the focus control so as to reduce the defocus amount with respect to the imaging position of the object in the future based on the imaging position of the object in the future which is estimated, and wherein when the shooting magnification is equal to or larger than a predetermined value, the control unit sets a number of data of the imaging position of the object in the past which are used to estimate the imaging position of the object in the future, the number being smaller than a number of data of the imaging position of the object in the past in a case where the shooting magnification is smaller than the predetermined value.

4. A lens apparatus removably mountable to the image pickup apparatus according to claim 3, comprising the shooting optical system.

5. An image pickup apparatus, comprising:

a magnification information obtaining unit for obtaining information including a shooting magnification of a shooting optical system;

a control unit for performing focus control on the shooting optical system; and a detection unit for detecting a defocus amount corresponding to a difference between an image pickup position of an object and an imaging position of the object which is formed by the shooting optical system, wherein when the shooting magnification is equal to or larger than a predetermined value, the control unit repeats the focus control even after an in-focus state of the shooting optical system is obtained by the focus control so as to reduce the defocus amount with respect to an imaging position of the object in the past without estimating an imaging position of the object in the future, and wherein when the shooting magnification is smaller than the predetermined value, the control unit estimates the imaging position of the object in the future based on the imaging position of the object in the past and repeats the focus control even after the in-focus state of the shooting optical system is obtained by the focus control so as to reduce the defocus amount with respect to the imaging position of the object in the future based on the imaging position of the object in the future which is estimated.

* * * * *